(12) United States Patent
Pope et al.

(10) Patent No.: US 8,989,821 B2
(45) Date of Patent: Mar. 24, 2015

(54) BATTERY CONFIGURATIONS FOR ELECTRONIC DEVICES

(75) Inventors: Benjamin John Pope, Sunnyvale, CA (US); Daniel William Jarvis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 546 days.

(21) Appl. No.: 13/222,806

(22) Filed: Aug. 31, 2011

(65) Prior Publication Data

US 2013/0053110 A1 Feb. 28, 2013

(51) Int. Cl.
*H04B 1/38* (2006.01)
*H01M 2/10* (2006.01)

(52) U.S. Cl.
CPC .................. *H01M 2/1066* (2013.01)
USPC ........... 455/572; 455/100; 429/100; 429/178; 429/7

(58) Field of Classification Search
CPC ....... H01M 2/0404; H01M 2/30; H01M 2/22; H01M 10/0431; H01M 2/26; H01M 2/0482; B29C 2045/14131; B29C 45/14639; B32B 15/08; B32B 15/085; B32B 2457/10; B32B 27/08; H01G 9/08
USPC ................. 455/572; 429/100, 178, 7
See application file for complete search history.

(56) References Cited

U.S. PATENT DOCUMENTS

| | | | |
|---|---|---|---|
| 2,798,895 A | 7/1957 | Nowotny | |
| 2,798,896 A | 7/1957 | Bly | |
| 5,580,676 A | 12/1996 | Honda et al. | |
| 6,106,973 A | 8/2000 | Sonozaki et al. | |
| 6,358,644 B1 | 3/2002 | Shibata et al. | |
| 6,528,204 B1 | 3/2003 | Hikmet et al. | |
| 6,924,551 B2 | 8/2005 | Rumer et al. | |
| 7,288,340 B2 | 10/2007 | Iwamoto | |
| 7,356,923 B2 | 4/2008 | Honer | |
| 7,622,895 B1 | 11/2009 | Griffin | |
| 7,663,064 B2 | 2/2010 | Dutta et al. | |
| 7,910,243 B2 | 3/2011 | Koh et al. | |
| 8,031,122 B2 | 10/2011 | Jang et al. | |
| 8,259,013 B2 | 9/2012 | Jang et al. | |
| 8,293,402 B2 * | 10/2012 | Lee ................................ | 429/178 |
| 8,558,509 B2 | 10/2013 | He et al. | |
| 2003/0129483 A1 | 7/2003 | Gross | |
| 2007/0154794 A1 | 7/2007 | Kim et al. | |
| 2007/0264535 A1 * | 11/2007 | Lee et al. ........................ | 429/7 |
| 2008/0274412 A1 * | 11/2008 | Yamada ........................ | 429/322 |
| 2009/0246620 A1 | 10/2009 | Lee et al. | |
| 2009/0317708 A1 | 12/2009 | Brandl et al. | |
| 2010/0081049 A1 | 4/2010 | Holl et al. | |
| 2010/0093407 A1 * | 4/2010 | Kawata et al. ................. | 455/572 |
| 2010/0316911 A1 * | 12/2010 | Tesson et al. .................. | 429/246 |

(Continued)

FOREIGN PATENT DOCUMENTS

| | | |
|---|---|---|
| EP | 0792741 | 2/1986 |
| EP | 1931010 | 6/2008 |

(Continued)

*Primary Examiner* — Edward Urban
*Assistant Examiner* — Max Mathew
(74) *Attorney, Agent, or Firm* — Brownstein Hyatt Farber Schreck, LLP (57) ABSTRACT

Electronic devices having improved battery configurations, and more specifically configurations reducing overall space required for a battery and attendant electronics, as well as providing restraining mechanisms to prevent a battery from impacting these electronics.

18 Claims, 6 Drawing Sheets

(56) References Cited

U.S. PATENT DOCUMENTS

| | | | |
|---|---|---|---|
| 2010/0323238 A1* | 12/2010 | Takahashi et al. | 429/179 |
| 2011/0076550 A1* | 3/2011 | Liang et al. | 429/175 |
| 2011/0076552 A1* | 3/2011 | Taniguchi et al. | 429/181 |
| 2011/0175569 A1 | 7/2011 | Austin | |
| 2011/0210954 A1 | 9/2011 | Murphy et al. | |
| 2011/0215480 A1 | 9/2011 | Gorczyca et al. | |
| 2011/0236727 A1* | 9/2011 | Jang | 429/7 |
| 2011/0274959 A1* | 11/2011 | Bailey et al. | 429/124 |
| 2011/0287318 A1* | 11/2011 | Loveness et al. | 429/218.1 |
| 2012/0121944 A1* | 5/2012 | Yamamoto et al. | 429/7 |
| 2012/0270085 A1* | 10/2012 | Taniguchi et al. | 429/94 |
| 2013/0034763 A1* | 2/2013 | Byun | 429/96 |
| 2013/0071696 A1* | 3/2013 | Kim et al. | 429/7 |
| 2013/0171490 A1 | 7/2013 | Rothkopf et al. | |
| 2014/0050948 A1* | 2/2014 | Hashimoto et al. | 429/7 |
| 2014/0065474 A1 | 3/2014 | Werner et al. | |
| 2014/0147703 A1 | 5/2014 | Werner et al. | |
| 2014/0147730 A1 | 5/2014 | Werner | |

FOREIGN PATENT DOCUMENTS

| | | |
|---|---|---|
| EP | 2653053 | 10/2013 |
| JP | 61032951 | 2/1986 |
| JP | 63314770 | 12/1988 |
| JP | 10012200 | 1/1998 |
| JP | 2000058018 | 2/2000 |
| JP | 2001118547 | 4/2001 |
| JP | 2001250516 | 9/2001 |
| JP | 2001332752 | 11/2001 |
| JP | 2007165200 | 6/2007 |
| KR | 20090075396 | 7/2009 |
| WO | WO00/41252 | 7/2000 |
| WO | WO2008/023199 | 2/2008 |
| WO | WO2011000239 | 1/2011 |

* cited by examiner

BATTERY CONFIGURATIONS FOR ELECTRONIC DEVICES

TECHNICAL FIELD

Embodiments described herein may take the form of electronic devices having improved battery configurations, and more specifically configurations reducing overall space required for a battery and attendant electronics, as well as providing restraining mechanisms to prevent a battery from impacting these electronics.

BACKGROUND DISCUSSION

Nearly every electronic device in modern society employs some type of battery as a primary or backup power source. Battery life is extremely important, as it generally determines how long the associated electronic device can operate without recharging. In space-constrained enclosures, the overall size of the battery and the space available in which the battery may be placed directly influence the operational life of the electronic device.

However, the current trend is to make portable electronic devices ever smaller. Maintaining an acceptable battery life for such devices is crucial, and is in direct tension with the drive to reduce device size. In many modern portable electronic devices, the battery may occupy as much as 50% or more of a product's interior volume. Thus, increasing the volume available to the battery may be useful, in that it may extend the overall operational time of the electronic device. Accordingly, it is desirable to configure the battery and related electronics to minimize the space around the battery, which in turn permits more space to be taken up by a larger battery. If tolerances for, and space occupied by, other internal electronic components can be minimized, then more space may be devoted to the battery.

SUMMARY

One embodiment takes the form of a battery arrangement, comprising: a battery having a length and a height; at least one electrode extending from the battery along the battery's length; a circuit affixed to the at least one electrode and including a substrate and at least one electrical component affixed to the substrate; wherein the electrical component projects away from the substrate and toward a side of the battery. The at least one electrode may bend at a substantially 90 degree angle.

Another embodiment takes the form of a battery arrangement, comprising: a battery; a surface supporting the battery; a retaining structure affixed to the surface, the retaining structure operative to resist a motion of the battery; and an electrical component on a side of the retaining structure opposite the battery, such that the retaining structure prevents the battery from impacting the electrical component. The battery may include: a gel interior; a flexible container encompassing the gel interior; a tail formed from a portion of the flexible container; wherein a portion of the tail passes through an aperture in the retaining structure; and the portion of the tail is affixed to the retaining structure.

Still another embodiment may take the form of a mobile device, comprising: an enclosure defining an interior volume; a plate located within the interior volume; a battery located within the interior volume and affixed to the plate; at least one electrode exiting the battery and bending to extend toward a surface of the enclosure; a circuit formed on a rigid flex and affixed to the electrode, such that an edge of the rigid flex perpendicular to a long axis of the electrode is parallel to the surface of the enclosure; wherein the at least one electrode bends a single time at approximately a 90 degree angle; and the circuit projects from the rigid flex toward a wall of the battery.

DETAILED DESCRIPTION

Generally, embodiments described herein may take the form of an electronic device having an improved battery arrangement. Embodiments may secure a battery within an interior of the electronic device to prevent the battery from impacting other internal components. As one example, a retaining structure may separate the battery from one or more internal components. The retaining structure may be positioned and formed such that the battery is likely to strike the structure rather than the internal component(s) when the electronic device experiences undesired or unanticipated force, such as a fall.

In some embodiments, the electronic device takes the form of a mobile smartphone. The smartphone may have a mid-plate located within, and attached to, its enclosure. The mid-plate may be made from metal, ceramic, certain plastics, polymers, and the like. The mid-plate may extend across substantially all of the phone's interior or may occupy only a portion of the interior. Typically, although not necessarily, the mid-plate lies in a major plane of the smartphone (e.g., a plane cutting through the smartphone's shortest axis, and substantially perpendicular thereto).

The mid-plate generally provides a surface on which internal components of the smartphone may be anchored. The mid-plate, in turn, is typically affixed to the housing of the smartphone, thereby imparting structural stability and/or rigidity to both the affixed components and the phone itself. The retaining structure may be affixed to the mid-plate at or near an edge of the battery and typically between the battery and a protected internal component. In embodiments using a gel battery, the retaining structure may prevent the gel battery from shifting sufficiently to impact the internal component. Likewise, the retaining structure may be configured to prevent or reduce the chance of the gel battery rupturing when it impacts the retaining structure.

Embodiments may also use a gel battery having a modified wrap and/or tail structure. Generally, the battery may be rolled into a cylinder having a spiral in cross-section, so that the battery wraps from a first edge, along a width of the battery, to the opposing edge. The width of the battery may determine how many "wraps" or spirals are present in the battery. Alternatively, the battery may be folded upon itself to form a cuboid or other prism shape. The references to a "cuboid" or "prism shape" should be understood to be general; the battery may have rounded corners instead of right-angled corners, or may be a parallelepiped.

The gel battery, once wrapped, may be sealed in a flexible container. The container may have a tail or seam where the flexible material seals to itself in order to encompass the battery. Electrodes may extend through the tail in order to provide an electrical connection between the battery and internal components. In some embodiments, the electrodes may connect to a rigid flex material on which internal components may be mounted. The electrodes may, for example, exit the flexible container, bend 90 degrees and be electrically connected to the rigid flex. The rigid flex may extend in a direction paralleling the height of the battery.

The rigid flex may be a substrate for, or part of, a battery safety circuit. The safety circuit may include a variety of electrical components, each of which are electrically connected to the flex. The safety circuit may monitor the battery and prevent overcharging and/or over-discharging, as well as regulating power draw from the battery (among other functions). Generally, the safety circuit, including the rigid flex, is longer in a first dimension than in a second dimension. Accordingly, in portable electronic devices where internal space is at a premium, orienting the rigid flex so that its first dimension parallels a height of the battery while its second dimension parallels a length (or width) of the battery may reduce the overall volume taken up by the combination of circuit and battery. That is, so long as the rigid flex's second dimension is equal to or less than the battery height, orienting the electrodes and rigid flex such that the electrodes bend only once may free up internal space, as described in more detail herein. This additional space may then be used to increase battery size or be dedicated to other internal components. Alternately, the overall size of the portable electronic device may be reduced since less internal volume is necessary to hold the battery, safety circuit and other interior components.

Figure 1:
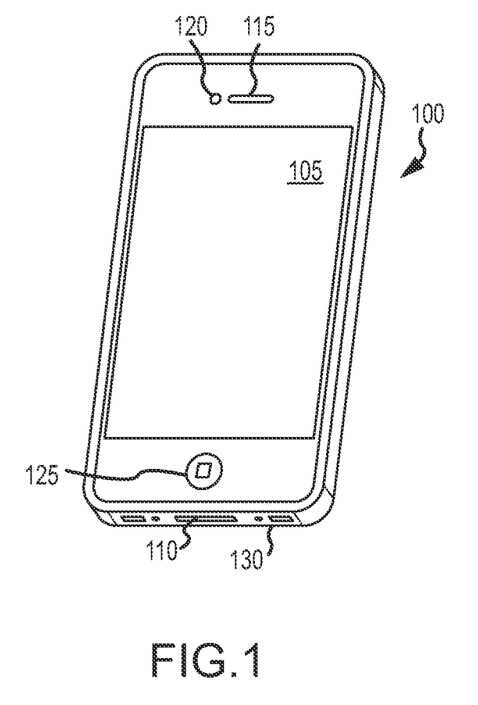
FIG. 1 depicts an isometric view of a sample portable electronic device.

FIG. 1 generally depicts a sample electronic device 100 that may implement an improved battery arrangement and/or structure, as described herein. The electronic device may be a mobile smartphone, as shown. Although a mobile phone is depicted, it should be appreciated that the teachings, methods, and systems herein may be used in nearly any portable electronic device, including a tablet computer, laptop computer, calculator, and so on.

The smartphone 100 may include a display 105, connection structure 110, speaker 115, sensor 120 (such as an ambient light sensor), input 125, and microphone 130. The operation of each of these elements, and the operation of the smartphone 100 generally, is understood to those of ordinary skill and accordingly will not be described further herein. Each of these items, as well as a variety of internal components (such as one or more processors, haptic feedback devices, sensors and the like) all draw power from a battery located in an interior cavity within the smartphone housing.

Figure 2:
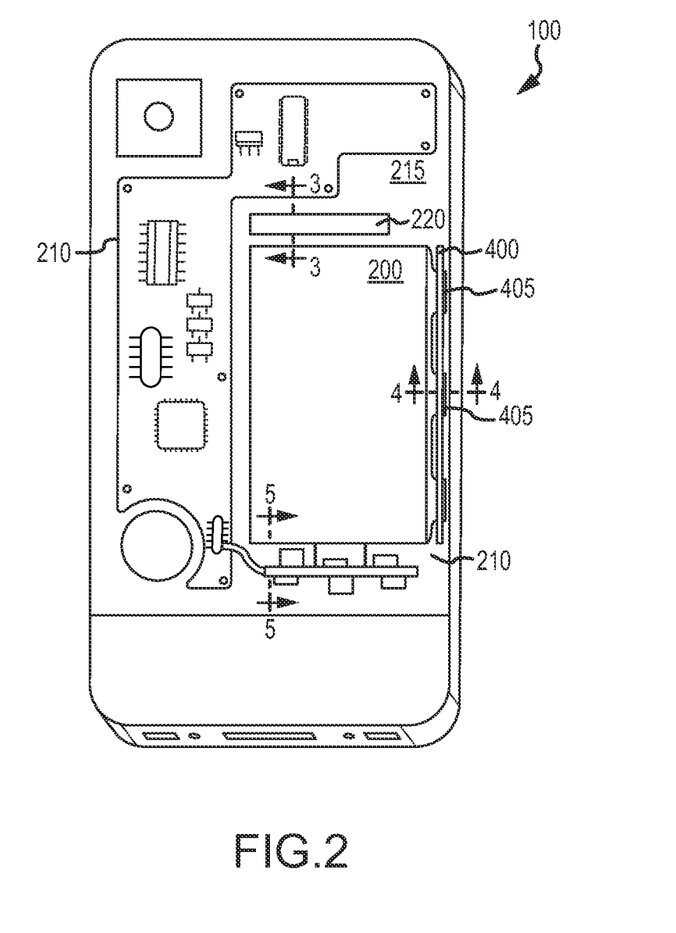
FIG. 2 depicts the portable electronic device of FIG. 1 with its rear surface removed.

FIG. 2 shows the smartphone 100 of FIG. 1 with its rear face removed.

As shown to best effect in FIG. 2, the battery 200 occupies a majority of the interior space of the smartphone 100 and is a gel battery in a flexible container. The battery is adhered to a mid-plate 205 at the battery's bottom surface (e.g., the surface adjacent the mid-plate). A circuit board 210 or other substrate may occupy a portion of the interior cavity 215 of the electronic device 100. The circuit board may also be affixed to the mid-plate 205.

Various internal components may be mounted to the circuit board 210, as known to those of ordinary skill in the art. These internal components provide the various functions of the smartphone 100 and may be configured and/or located differently in different embodiments. Likewise, the physical arrangement of the battery 200, mid-plate 205, circuit board 210 and the like may vary in differing embodiments. As one example, the mid-plate 205 may extend across only a portion of the electronic device's interior cavity 215. It should be appreciated that the view of FIG. 2 (and other figures herein) are generally schematic and representational, rather than exact. Accordingly, not all internal components are shown and not all interconnections between components are shown. Rather, the figures provide a general overview to illustrate certain principles of embodiments discussed herein.

The adhesive bond between the battery 200 and mid-plate 205 generally holds the battery in place. More specifically, the flexible container is adhered to the mid-plate and the soft gel battery is contained within the container. However, it should be appreciated that the gel may shift to some degree within the flexible container. In instances where the adhesive does not extend exactly to the edges of the flexible container, shifts in the gel may cause the flexible container to "roll" in the direction of the gel shift. Thus, the edges of battery 200 may move slightly with respect to the mid-plate, even though the two are affixed to one another.

The battery 200 may shift or move with respect to the mid-plate 205, for example, when the smartphone 100 is dropped or struck. Although an impact or other force may move the battery a relatively small distance, the tolerance in modern electronic devices is such that even a small shift may cause the battery to strike a nearby internal component. If this occurs, the internal component may be damaged or loosened, which in turn may hinder operation of the electronic device. In some cases, the internal component may be electrically shorted by a sufficient impact from the battery 200. Alternately, the internal component may be jarred loose. In either event, the component may cease operating or work only intermittently, thereby causing the electronic device 100 to fail either intermittently or totally.

In order to isolate the battery 200 from internal components during an impact or other abrupt force, a retaining structure 220 may be used. The retaining structure 220 may be formed from metal, plastic, a ceramic or any other suitable material. Generally, the retaining structure 220 sits between the battery 200 and a portion of the circuit board 210 on which an internal component to be protected is located. Alternately, if the protected internal component is not mounted to the circuit board, the retaining structure 220 may be located between the component and battery.

Figure 3:
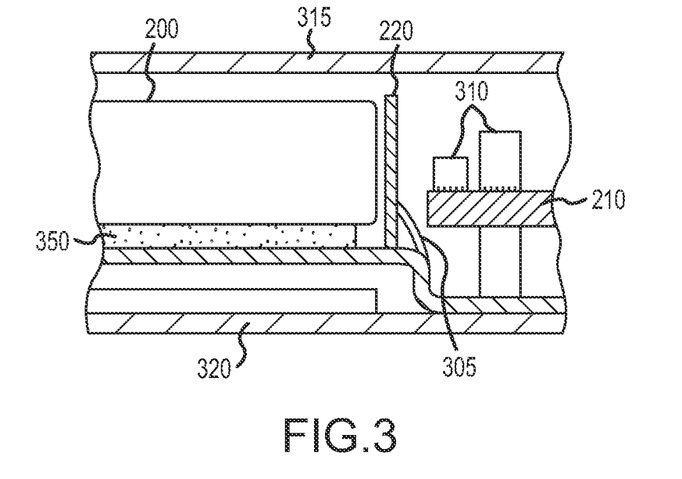
FIG. 3 is a cross-sectional view of the portable electronic device of FIG. 1 taken along line 3-3 of FIG. 2.

The retaining structure 220 may be generally rectangular in cross-section, although it need not be. The retaining structure may be adhered, mechanically fastened, welded (including ultrasonically welded) or otherwise affixed to the mid-plate 205. The retaining structure 220 may match one or more dimensions of the battery 200 (e.g., be as long, wide or tall as the battery) or may be smaller or larger in any such dimension. For example, the retaining structure shown in FIGS. 2 and 3 is approximately the same height as the battery, but their widths differ. The retaining structure generally may stop battery motion by absorbing impact from a portion of the battery's sidewall; it need not extend across the entire sidewall.

The retaining structure 220 may have rounded corners and/or edges to minimize force discontinuities when the battery impacts the structure. Sharp edges may be more likely to puncture, rip or otherwise compromise the flexible container of the battery. If the flexible container tears, the gel may leak into the interior compartment of the electronic device 100. Since the gel is conductive, any leak may short or damage internal components.

It should be appreciated that the retaining structure 220 may be formed from a number of individual pieces. For example, a series of fingers may extend upwardly from the mid-plate 205. These fingers may cooperate to perform the functions ascribed herein to the retaining structure 220. The fingers may be connected at their bases or may be freestanding. Likewise, the fingers may be affixed to the mid-plate 205 in any suitable fashion.

In some embodiments, portions of the mid-plate 205 may be cut and then bent upward to form the fingers. This may provide the retaining structure 220 previously described while leaving sufficient material in the mid-plate 205 to support the weight of the battery. If the fingers are formed from the mid-plate 205, they may be sized and/or spaced such that the apertures left in the mid-plate after bending the fingers upward are sufficiently small or narrow that the gel battery 200 does not seep or sag through them.

FIG. 3 is a cross-sectional view taken along line 3-3 of FIG. 2. As shown in this figure, the retaining structure 220 is spaced apart from both the battery 200 and circuit board 210 protected/internal components 310 when the electronic device 100 is at rest. FIG. 3 also shows the adhesive 300 affixing the battery 200 to the mid-plate 205. As shown, the adhesive 300 may not reach the edge of the battery 200, which is why the battery may move when the device is impacted. The lower surface 315 and upper surface 320 of the electronic device 100 are also shown.

FIG. 3 also shows an optional brace 305 that may connect the retaining structure 220 to the mid-plate 205. The brace may be angled in order to reinforce the retaining structure and transmit any impact force from the battery to the mid-plate, thereby helping the retaining structure resist motion of the battery. It should be appreciated that the brace 305 may not be present in certain embodiments. In embodiments including the brace 305, both the brace and a base of the retaining structure may be affixed to the mid-plate. For example, one end of the brace may be affixed to the mid-plate and another end affixed to a midsection of the retaining structure located above the base. In some embodiments, the retaining structure may be less than one millimeter away from the battery. In certain embodiments, the two may abut.

Figure 4:
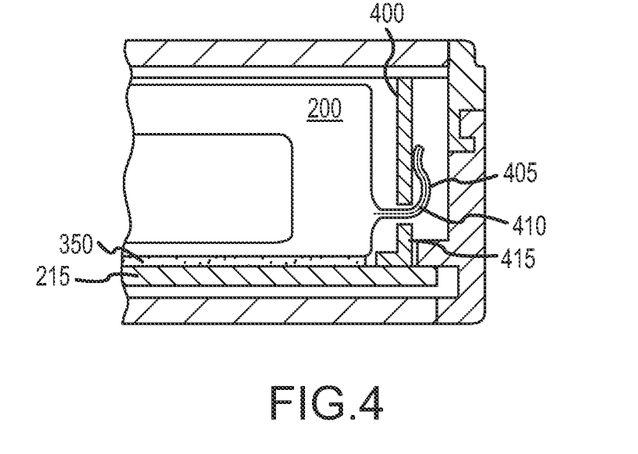
FIG. 4 is a cross-sectional view of the portable electronic device of FIG. 1 taken along line 4-4 of FIG. 2

FIG. 4 is a cross-sectional view taken along line 4-4 of FIG. 2. It shows a second retaining structure 400 that may function generally like the previously-discussed retaining structure 220. This retaining structure may resist motion of the battery 200 along a different axis than that of motion resisted by the first retaining structure 220.

FIG. 4 also shows the tail 405 and seam 410 formed by fusing portions of the flexible container to each other. The seam 410 prevents the gel inside the battery 200 from exiting the flexible container. The tail 405 typically is a byproduct of this fusing process and may be found in many conventional gel batteries.

In some embodiments, the tail 405 may cooperate with the retaining structure 400 to hold the battery 200 in place. A segment of the tail 405 may pass through an aperture 415 in the retaining structure. The tail 405 may be adhered or otherwise affixed to the retaining structure 400 on a side opposite the side facing the battery 200. In this manner, the battery may be affixed to the retaining plate. This may reduce the maximum distance between the battery 200 and retaining structure 400, thereby reducing the maximum possible travel of the battery within the internal compartment. In essence, the tail may help to fix the battery in place. It should be appreciated that the tail may be segmented and drawn through a plurality of apertures 415 within the retaining structure 400. Alternately, if the retaining structure is formed from a number of fingers, the tail may be drawn between the fingers.

The retaining structure may be formed of multiple elements at differing distances from the battery 200. For example, a first plate or wall may be placed near the battery with an aperture therein. The aperture may be sized to receive a portion of the battery relatively snugly. A second plate or wall may be placed behind the aperture at some distance, thereby permitting the battery to extend partly through the aperture. The first plate may reduce movement of the battery in a direction parallel to the plate's length, since it traps a portion of the battery. The second plate may prevent battery motion in a direction orthogonal to the second plate's length by physically absorbing impact from, and thus, stopping, such battery motion. The two plates may thus form a single retaining structure that inhibits battery motion along multiple axes.

It should be appreciated that some embodiments may provide some space behind the retaining structure 400 (e.g., on the side opposite the battery 200) so that the structure may deform upon a battery impact without itself hitting any interior components.

Figure 5:
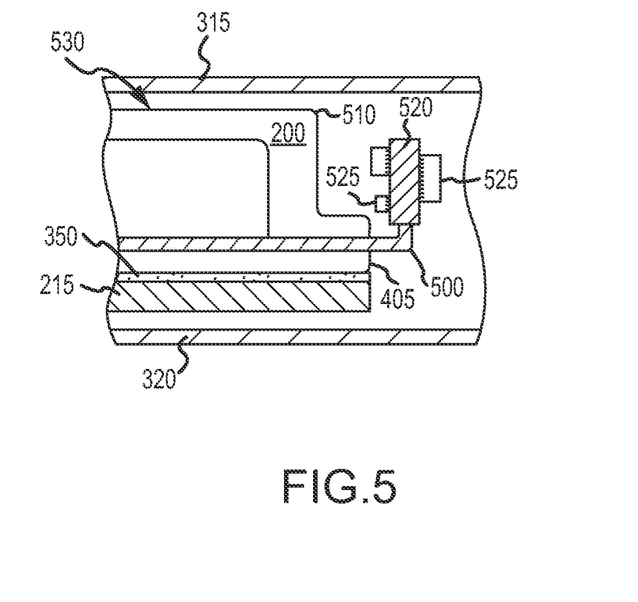
FIG. 5 is a cross-sectional view of the portable electronic device of FIG. 1 taken along line 5-5 of FIG. 2.

FIG. 5 is a cross-section taken along line 5-5 of FIG. 2. This cross-section shows multiple electrodes 500 exiting the flexible container 510 at one edge thereof. Specifically, the electrodes 500 are shown passing through a tail 405. The seam 410 may be formed around the electrodes 500, so that the interior contents 515 of the battery 200 do not seep out where the electrodes exit the tail. (It should be noted that a single battery might have multiple tails 405. Likewise, the tail 405 shown in FIG. 5 is not shown in FIG. 2.)

As shown to best effect in FIG. 5, the electrodes 500 generally exit the flexible container 510 and bend approximately 90 degrees to run parallel to the height of the battery 200. The electrodes 500 may be electrically connected to a rigid flex 520. The electrodes may extend from the middle of the rigid flex or may be connected to one of the flex's sides. For example, the electrodes may connect to an interior layer of the rigid flex. Electrical components 525 may be mounted to the rigid flex and draw power from the battery 200 through the electrodes 500. The rigid flex serves as a substrate for the electrical components, which generally (although not necessarily) are part of a battery safety circuit.

The shortest dimension of the rigid flex 520 is generally orthogonal to the battery's height. The flex 520 may be mounted as close as is practicable to the battery 200, taking into account the dimensions of any electrical components 525 affixed to the flex and the minimum bend radius of the electrodes 500. Typically, the rigid flex 520 does not extend beyond the top surface 530 of the battery. Since the mounting surface for the components 525 is the flex itself, the electrodes may be easily integrated with the flex to deliver power to the components.

Figure 6:
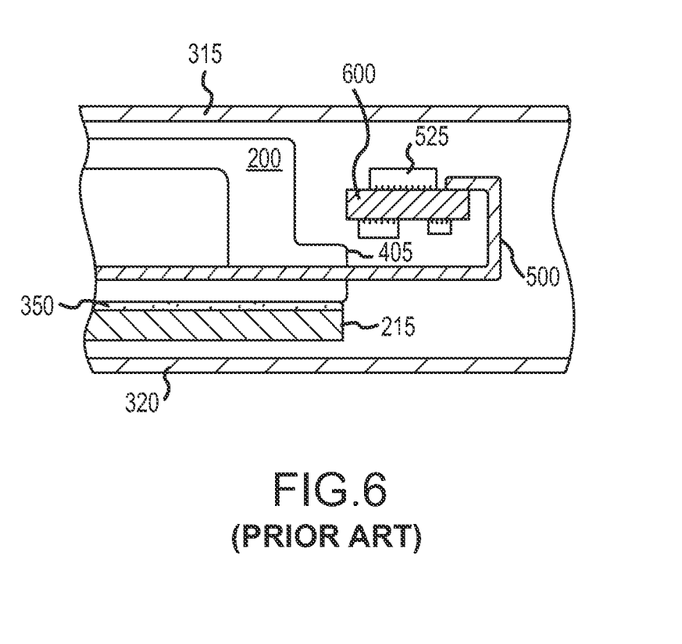
FIG. 6 is a cross-sectional view similar to that of FIG. 5, showing a prior art arrangement of internal components.

FIG. 6 shows a prior art arrangement of the electrode assembly 500, generally corresponding to the view of FIG. 5. As shown in FIG. 6, the electrodes 500 exit the battery 200 and curl in a backwards C-shape to be electrically connected to a rigid circuit board 600. The rigid board 600 generally is oriented 90 degrees from the rigid flex 520 shown in FIG. 5. That is, the rigid board 600 is substantially parallel to the mid-plate 205 and a face of the electronic device 100 such as the front of the electronic device, as shown in FIG. 1. The electrodes 500 overlay the rigid board 600 and are connected thereto. The rigid board 600 is a substrate for the battery safety circuit.

Because the rigid board 600 has a minimum width (e.g., extension in the left-right directions as viewed in FIG. 6), it occupies a certain distance at the base of the battery. This distance is larger than that required by the rigid flex of FIG. 5, insofar as the width of the flex is less than the width of the rigid circuit board 600.

By contrast, the height of the rigid flex 520 is greater than the height of the rigid circuit board 600 (e.g., extension up and down as viewed in FIGS. 5 and 6). However, since the battery 200 has a height greater than that of the rigid flex 520, the flex height does not determine minimum spacing between the front and rear walls 530, 535 of the electronic device. Accordingly, the rigid flex 520 arrangement creates less dead space than that of the circuit board 600 arrangement. Thus, the rigid flex arrangement requires less internal volume than does the prior art circuit board setup. Since the overall dimensions of the electronic device 100 are set by the necessary space/volume required in the internal cavity to house all components, an electronic device employing the configuration shown in FIG. 5 may be smaller than one employing the configuration of FIG. 6.

Generally, in certain embodiments the overall distance between the point of the electrode 500/circuit board 600 configuration farthest from the battery 200 and the battery itself is approximately five millimeters. By contrast, in some embodiments like the one shown in FIG. 5, the distance between the farthest part of the electrode/flex configuration and the battery wall is approximately 3.9 millimeters. Thus, the arrangement shown in FIG. 5 may conserve space in the interior cavity of the electronic device 100; such space is at a premium and may directly impact the minimum size of the device.

Alternative embodiments may vary the physical configuration and/or structure from that shown in FIG. 5. For example, in some embodiments the rigid flex 520 may extend through the seam and directly into the battery 200, thereby eliminating any intervening electrodes 500. In still other embodiments, a conductive patch or section may be formed on the flexible container itself, again eliminating the need for electrodes 500, or alternately eliminating any need for electrodes to pass through the container. In still other embodiments, the rigid flex 500 may also serve as a retaining structure 220.

Certain advantages may be created by the embodiment shown in FIG. 5. For example, wires are generally weaker and more prone to snapping/deforming/breaking at bends or flex points. Thus, the electrode 500 arrangement of FIG. 5 may be less likely to experience failure than that of FIG. 6, insofar FIG. 5's arrangement has fewer bends in the electrodes. Likewise, the rigid flex of FIG. 5 does not face any electronic components 525 thereon toward either the lower or upper surfaces 315, 320 of the electronic device, although the arrangement of FIG. 6 does. Accordingly, impacts to either the front or rear of the electronic device 100 may be more likely to drive the upper or lower surfaces into contact with these electronic components if the arrangement of FIG. 6 is employed. Thus, the rigid flex and electrode configuration shown in FIG. 5 may protect internal components from undue impacts.

It should be appreciated that the foregoing description has broad application, and the embodiments described herein are subject to modifications and changes that will be readily apparent to those of ordinary skill in the art upon reading the description. For example, while examples disclosed herein may discuss particular configurations for a retaining structure for a battery inside an electronic device, it should be appreciated that the retaining structure may take a variety of forms. As one example, the structure may be curved or arcuate instead of generally flat. This may permit the retaining structure to deflect force inward when impacted by a battery, essentially channeling battery motion to a particular area. Similarly, although the embodiments may be discussed with respect a particular mobile electronic device, the devices and techniques disclosed herein are equally applicable to other types of devices. Accordingly, the discussion of any embodiment is meant only to be exemplary and is not intended to suggest that the scope of the disclosure, including the claims, is limited to these examples.

All directional references are only used for identification purposes to aid the reader's understanding of the present disclosure, and do not create limitations, particularly as to the position, orientation, or use of this disclosure. Connection references (e.g., attached, coupled, connected, affixed, adhered and the like) are meant to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

We claim:

1. A battery arrangement, comprising:
   a battery having a length and a height;
   at least one electrode extending from the battery along the battery's length;
   a circuit affixed to the at least one electrode and comprising:
      a substrate; and
      at least one electrical component affixed to the substrate; wherein
   the electrical component projects away from the substrate and toward a side of the battery;
   the circuit is not positioned between the at least one electrode and the side of the battery; and
   the at least one electrode is not positioned between the circuit and the side of the battery.

2. The battery arrangement of claim 1, wherein the at least one electrode bends a single time outside the battery.

3. The battery arrangement of claim 2, wherein the at least one electrode bends at a substantially 90 degree angle.

4. The battery arrangement of claim 3, wherein the at least one electrode electrically connects to an interior layer of the substrate.

5. The battery arrangement of claim 1, wherein:
   the battery is a gel battery; and
   the at least one electrode extends through a flexible container of the battery.

6. The battery arrangement of claim 1, wherein the at least one electrode extends through a tail formed in the flexible container.

7. The battery arrangement of claim 1, wherein:
   the battery is affixed to a support surface; and
   both the electrode and substrate are not affixed to the support surface.

8. The battery arrangement of claim 7, wherein the support surface is a plate in a mobile electronic device.

9. The battery arrangement of claim 1, wherein the battery, electrode and circuit are all enclosed in an electronic device housing.

10. The battery arrangement of claim 9, wherein the electronic device is a mobile phone.

11. A mobile device, comprising:
   an enclosure defining an interior volume;
   a plate located within the interior volume;

a battery located within the interior volume and affixed to the plate;

at least one electrode exiting the battery and bending to extend toward a surface of the enclosure;

a circuit formed on a rigid flex and affixed to the electrode, such that an edge of the rigid flex perpendicular to a long axis of the electrode is parallel to the surface of the enclosure;

wherein the at least one electrode bends a single time at approximately a 90 degree angle; and the circuit projects from the rigid flex toward a wall of the battery;

the circuit is not positioned between the at least one electrode and the wall of the battery; and the at least one electrode is not positioned between the circuit and the wall of the battery.

12. The battery arrangement of claim 1, wherein the circuit is affixed to an end of the at least one electrode.

13. The battery arrangement of claim 1, wherein the substrate comprises rigid flex.

14. The battery arrangement of claim 1, wherein the circuit does not extend above a top surface of the battery.

15. The battery arrangement of claim 1, wherein the at least one electrical component projects away from the side of the battery.

16. The mobile device of claim 11, wherein the circuit is affixed to an end of the at least one electrode.

17. The mobile device of claim 11, wherein the circuit does not extend above a top surface of the battery.

18. The mobile device of claim 11, wherein at least one electrical component included in the circuit projects away from the side of the battery.

* * * * *